United States Patent [19]

Brunengo

[11] Patent Number: 5,535,547
[45] Date of Patent: Jul. 16, 1996

[54] CONDUIT AND FLOAT GAUGE APPARATUS

[76] Inventor: P. John Brunengo, 11940 SE. Idleman Rd., Portland, Oreg. 91266

[21] Appl. No.: 529,037

[22] Filed: Sep. 15, 1995

[51] Int. Cl.⁶ .............................. A47G 7/02; A47G 33/12
[52] U.S. Cl. ................................................ 47/40.5; 47/79
[58] Field of Search ..................................... 47/40.5, 79 I, 47/79 R

[56] References Cited

U.S. PATENT DOCUMENTS

| D. 319,416 | 8/1991 | Gehrke . | |
|---|---|---|---|
| 3,222,819 | 12/1965 | Marcan | 47/79 I |
| 3,871,131 | 3/1975 | Berglund | 47/79 I |
| 3,926,143 | 12/1975 | Hothan | 47/79 I |
| 4,270,309 | 6/1981 | Baumann | 47/79 I |
| 4,850,137 | 7/1989 | Foster | 47/40.5 |
| 4,930,252 | 6/1990 | Krause et al. . | |
| 4,993,176 | 2/1991 | Spinosa . | |
| 5,076,009 | 12/1991 | Cibor | 47/40.5 |
| 5,157,868 | 10/1992 | Munoz . | |
| 5,201,140 | 4/1993 | Voorhis . | |
| 5,243,782 | 9/1993 | Jones . | |
| 5,279,071 | 1/1994 | McDougall . | |
| 5,410,839 | 5/1995 | Granger | 47/40.5 |

Primary Examiner—Terry Lee Melius
Assistant Examiner—Joanne C. Downs

[57] ABSTRACT

A conduit and float gauge apparatus is provided for use with a tree placed in a water-retaining cup and includes a conduit unit which includes a bottom end portion that is placed in the water-retaining cup. One or more connector assemblies connect the conduit unit to the tree, such that the connector assemblies stabilize the conduit unit in a vertical orientation. A float assembly is housed within the conduit unit and includes a flotation member located within the bottom end portion of the conduit unit. The float assembly includes a riser unit connected to the flotation member. A gauge assembly is connected to a top riser portion of the riser unit. The conduit unit has a linear length sufficient to permit a person to add water to the top end portion of the conduit unit without bending down, getting on one's knees, or sitting down on a floor. The bottom end portion of the conduit unit and an intermediate portion of the conduit unit are oriented with respect to each other at an obtuse angle. A guide assembly is connected to a topmost portion of the top end portion of the conduit unit. The guide assembly receives and guides motion of the gauge assembly when water levels in the water-retaining cup rise and fall. The guide assembly includes a gauge-receiving aperture and a water-inlet aperture.

11 Claims, 3 Drawing Sheets

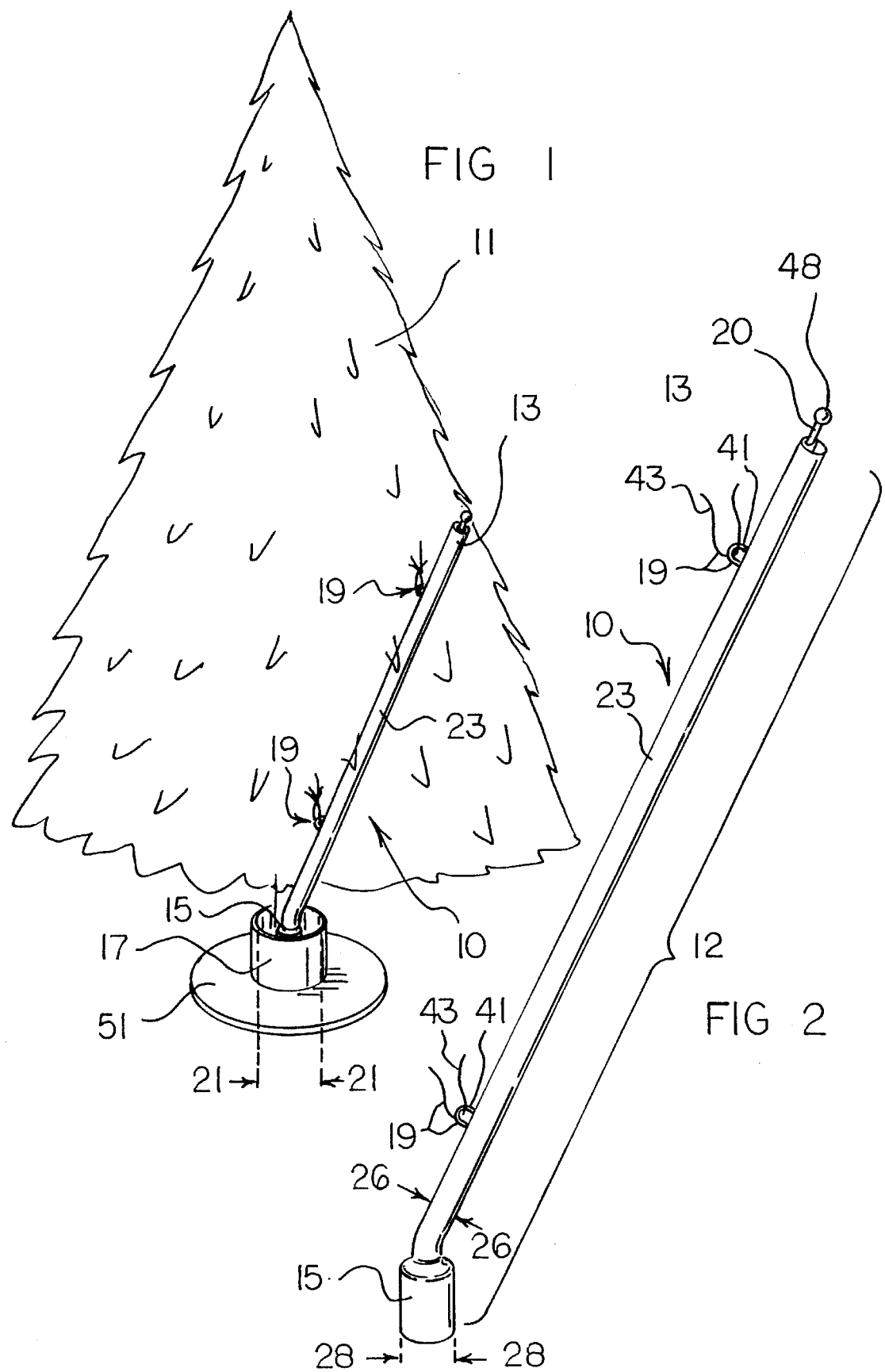

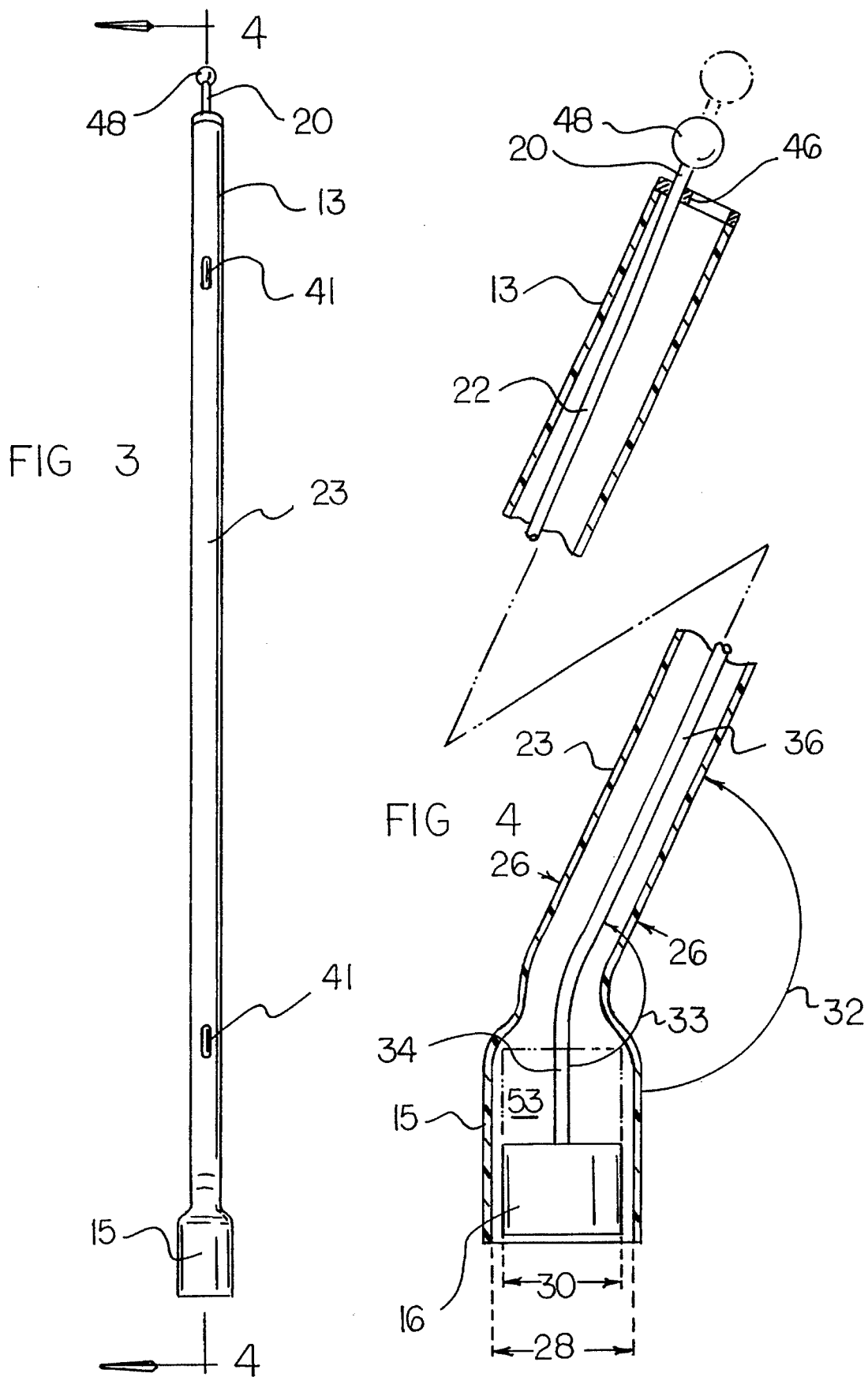

CONDUIT AND FLOAT GAUGE APPARATUS

BACKGROUND OF THE INVENTION

1. Field of the Invention

The present invention relates generally to devices for adding water to trees kept indoors and, more particularly, to a conduit for guiding water to the base of a tree and to a gauge for indicating the amount of water present at the base of the tree.

2. Description of the Prior Art

When plants are kept indoors, they must be periodically watered to keep them alive and healthy. When trees are kept indoors, there is an especially large requirement for periodic watering. For example, Christmas trees that are kept indoors have a particularly large water requirement. This is so for a number of reasons. First, the water helps keep the tree alive. Second, the water prevents the tree from drying out and becoming a fire hazard. This is especially important because the tree is generally draped with electric lamps and wiring which radiate heat.

Throughout the years, a number of innovations have been developed relating to devices for automatically watering Christmas trees, and the following U.S. patents are representative of some of those innovations: U.S. Pat. Nos. 4,930,252; 4,993,176; 5,201,140; 5,243,782; 5,279,071; and Des. 319,416. More specifically, each of the watering devices includes some sort of water reservoir and some sort of tubing or conduit to transfer water from the reservoir to the tree. Moreover, some of the Christmas tree watering devices include some sort of water flow control means for sensing when the Christmas tree needs an addition of water and for automatically controlling the flow of water to the tree. To avoid the complexities of a separate water reservoir, a water conduit, and a water flow control means, it would be desirable if a simple device could be provided that aided in watering Christmas trees that does not have a water reservoir, does not have a water conduit, and does not have a water flow control mechanism.

The Christmas tree watering devices disclosed in the patents cited above are generally placed on a portion of a floor near the base of the tree: Consequently, to fill the reservoir, to adjust the water conduit, or to adjust the water control mechanism, a person must bend down, get on one's knees, or sit down on the floor. For some persons, the acts of bending down, getting on one's knees, or sitting down on the floor are difficult to perform. In this respect, it would be desirable if a device were provided which aids in watering indoor trees without requiring a person to bend down, get on one's knees, or sit down on the floor in order to water the tree.

Still other features would be desirable in a device for aiding in watering indoor trees. For example, it would be desirable if the device for aiding in watering indoor trees had a water inlet that is approximately waist high so a person can stand up straight when watering the Christmas tree.

The base of a Christmas tree is located at a center of an imaginary circle, and branches of the tree radiate from the base. To get to the base of the tree to apply water to the base of the tree, it is often necessary to push aside or push through the lower branches of the tree which obstruct access to the base of the tree. To preclude the need for a person watering the tree to push aside or push through the lower branches of the tree to gain access to the base of the tree, it would be desirable if a device for aiding in watering indoor trees had a conduit which conveys water from the periphery of the tree to the base of the tree.

A conduit which conveys water from the periphery of a tree, at a waist high level, to the base of the tree must be supported in a stable way. To preclude the need for providing a separate and distinct support structure, it would be desirable if the water-conveying conduit were supported by the tree itself.

One way for a person to determine whether an indoor Christmas tree needs to be watered is for the person to feel the base materials to determine if they are wet or dry. To do so, the person must bend down, get on one's knees, or sit down on the floor. As stated above, such actions are to be avoided by some persons. In this respect, it would be desirable if a device were provided for aiding in watering indoor trees which allows the person to stand upright and determine whether there is a need to water the Christmas tree.

Thus, while the foregoing body of prior art indicates it to be well known to use devices for aiding in watering indoor trees, the prior art described above does not teach or suggest a conduit and float gauge apparatus which has the following combination of desirable features: (1) does not have a separate and distinct water reservoir and does not have a water-flow control mechanism controlling water flow from a reservoir to a tree; (2) aids in watering indoor trees without requiring a person to bend down, get on one's knees, or sit down on the floor in order to water the tree; (3) has a water inlet that is approximately waist high so that a person can stand up straight when watering a Christmas tree or other indoor tree; (4) has a conduit which conveys water from the periphery of the tree to the base of the tree; (5) provides a water-conveying conduit which is supported by the tree itself; and (6) allows the person to stand upright and determine whether there is a need to water the Christmas tree or other indoor tree. The foregoing desired characteristics are provided by the unique conduit and float gauge apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a conduit and float gauge apparatus for use with a tree placed in a water-retaining cup and includes a conduit unit which includes a top end portion, a bottom end portion, and an intermediate portion located between the top end portion and the bottom end portion. The bottom end portion is placed in the water-retaining cup. A connector assembly connects the conduit unit to the tree, such that the connector assembly stabilizes the conduit unit in a vertical orientation. A float assembly is housed within the conduit unit and includes a flotation member located within the bottom end portion of the conduit unit. The float assembly includes a riser unit connected to the flotation member. The riser unit extends from the bottom end portion of the conduit unit to the top end portion of the conduit unit. A gauge assembly is connected to a top riser portion of the riser unit. The gauge assembly includes an indicator portion which extends out from the conduit unit.

The conduit unit has a linear length sufficient to permit a person to add water to the top end portion of the conduit unit without bending down, getting on one's knees, or sitting down on a floor. Preferably, the conduit unit has a linear length which is at least three feet long. The connector assembly includes an eyelet attached to the conduit unit and a string threaded through the eyelet.

The water-retaining cup has an internal diameter; the intermediate portion of the conduit unit has a first internal diameter; and the bottom end portion of the conduit unit has a second internal diameter. The second internal diameter of the conduit unit is less than the internal diameter of the water-retaining cup and is greater than the first internal diameter of the conduit unit. The flotation member of the float assembly has an outer diameter which is less than the second internal diameter of the conduit unit and which is greater than the first internal diameter of the conduit unit. The bottom end portion of the conduit unit and the intermediate portion of the conduit unit are oriented with respect to each other at a first obtuse angle. The riser unit includes an intermediate riser portion connected to the top riser portion, and a bottom riser portion is connected to the intermediate riser portion. The bottom riser portion is connected to the intermediate riser portion at a second obtuse angle. The first obtuse angle and the second obtuse angle are preferably equal to each other. The obtuse angle causes the conduit unit to be angled away from the mid-portion of the tree so that one can add water to the conduit unit without needing to push aside branches of the tree.

A guide assembly is connected to a topmost portion of the top end portion of the conduit unit. The guide assembly receives and guides motion of the gauge assembly when water levels in the water-retaining cup rise and fall. The guide assembly includes a guide-receiving aperture which receives the gauge assembly, and a water-inlet aperture.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved conduit and float gauge apparatus which has all of the advantages of the prior art and none of the disadvantages.

It is another object of the present invention to provide a new and improved conduit and float gauge apparatus which may be easily and efficiently manufactured and marketed.

It is a further object of the present invention to provide a new and improved conduit and float gauge apparatus which is of durable and reliable construction.

An even further object of the present invention is to provide a new and improved conduit and float gauge apparatus which is susceptible of a low cost of manufacture with regard to both materials and labor, and which accordingly is then susceptible of low prices of sale to the consuming public, thereby making such conduit and float gauge apparatus available to the buying public.

Still yet a further object of the present invention is to provide a new and improved conduit and float gauge apparatus which does not have a separate and distinct water reservoir and does not have a water-flow control mechanism controlling water flow from a reservoir to a tree.

Still another object of the present invention is to provide a new and improved conduit and float gauge apparatus that aids in watering indoor trees without requiring a person to bend down, get on one's knees, or sit down on the floor in order to water the tree.

Yet another object of the present invention is to provide a new and improved conduit and float gauge apparatus which has a water inlet that is approximately waist high so that a person can stand up straight when watering a Christmas tree or other indoor tree.

Even another object of the present invention is to provide a new and improved conduit and float gauge apparatus that has a conduit which conveys water from the periphery of the tree to the base of the tree.

Still a further object of the present invention is to provide a new and improved conduit and float gauge apparatus which provides a water-conveying conduit which is supported by the tree itself.

Yet another object of the present invention is to provide a new and improved conduit and float gauge apparatus that allows the person to stand upright and determine whether there is a need to water the Christmas tree or other indoor tree.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the conduit and float gauge apparatus of the invention in place, supported by a Christmas tree.

FIG. 2 is an enlarged perspective view of the embodiment of the invention shown in FIG. 1 removed from the Christmas tree.

FIG. 3 is a further enlarged front view of the embodiment of the invention shown in FIG. 2.

FIG. 4 is an enlarged partial perspective view of the embodiment of the invention shown in FIG. 3 taken along line 4—4 thereof.

DESCRIPTION OF THE PREFERRED EMBODIMENT

Figure 5:
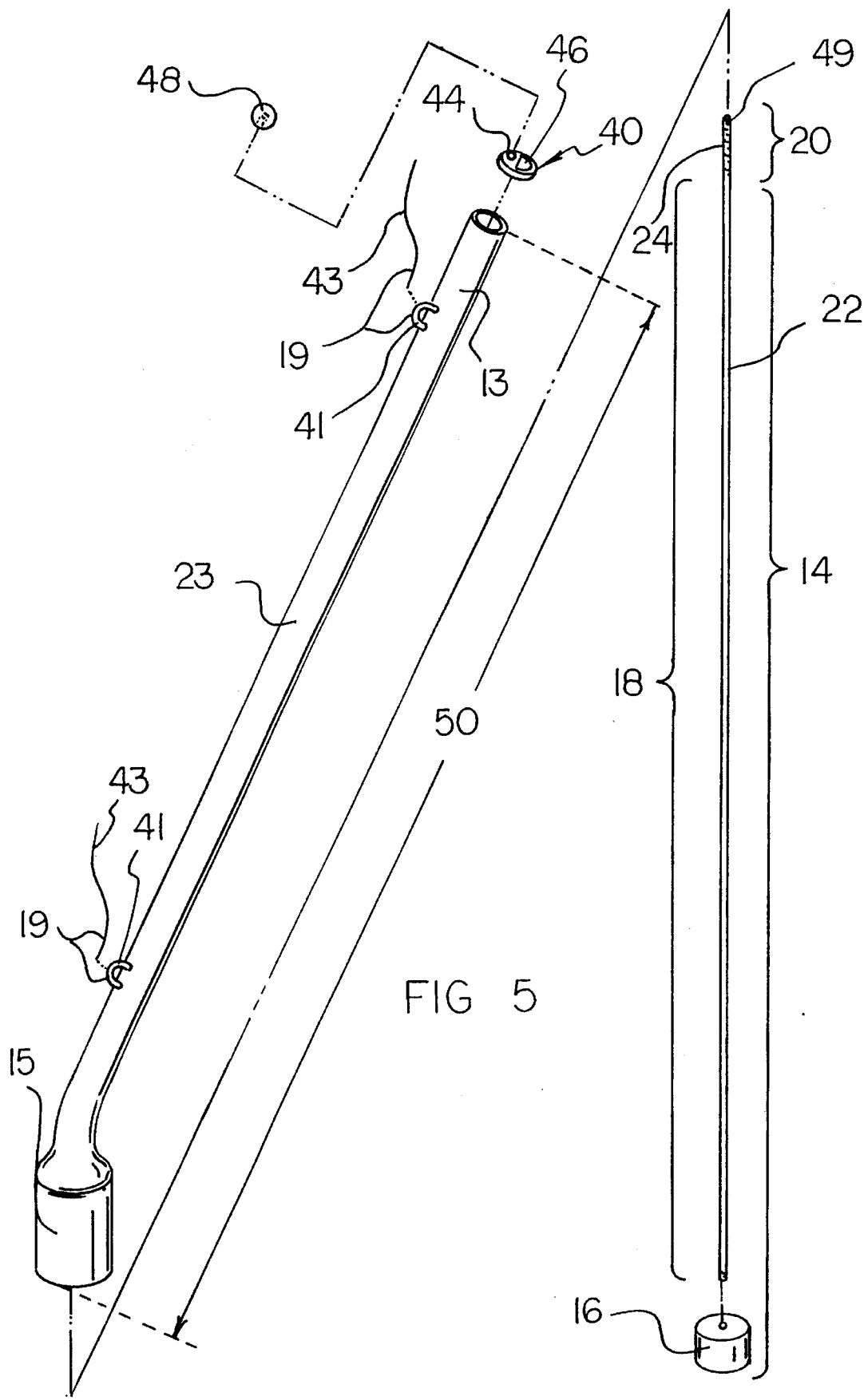
FIG. 5 is an exploded perspective view of the embodiment of the invention shown in FIG. 2.

With reference to the drawings, a new and improved conduit and float gauge apparatus embodying the principles and concepts of the present invention will be described.

Turning to FIGS. 1–5, there is shown an exemplary embodiment of the conduit and float gauge apparatus of the invention generally designated by reference numeral 10. In its preferred form, conduit and float gauge apparatus 10 is provided for use with a tree 11 placed in a water-retaining cup 17 and includes a conduit unit 12 which includes a top end portion 13, a bottom end portion 15, and an intermediate portion 23 located between the top end portion 13 and the bottom end portion 15. The bottom end portion 15 is placed in the water-retaining cup 17. A connector assembly 19 connects the conduit unit 12 to the tree 11, such that the connector assembly 19 stabilizes the conduit unit 12 in a vertical orientation. A float assembly 14 is housed within the conduit unit 12 and includes a flotation member 16 located within the bottom end portion 15 of the conduit unit 12. The float assembly 14 includes a riser unit 18 connected to the flotation member 16. The riser unit 18 extends from the bottom end portion 15 of the conduit unit 12 to the top end portion 13 of the conduit unit 12. A gauge assembly 20 is connected to a top riser portion 22 of the riser unit 18. The gauge assembly 20 includes an indicator portion 24 which extends out from the conduit unit 12.

The conduit unit 12 has a linear length 50 sufficient to permit a person to add water to the top end portion 13 of the conduit unit 12 without bending down, getting on one's knees, or sitting down on a floor. Preferably, the conduit unit 12 has a linear length 50 which is at least three feet long.

The connector assembly 19 includes an eyelet 41 attached to the conduit unit 12 and a string 43 threaded through the eyelet 41. To attach the conduit unit 12 to the tree 11, the string 43 is tied to a portion of the tree 11.

The water-retaining cup 17 has an internal diameter 21; the intermediate portion 23 of the conduit unit 12 has a first internal diameter 26; and the bottom end portion 15 of the conduit unit 12 has a second internal diameter 28. The second internal diameter 28 of the conduit unit 12 is less than the internal diameter 21 of the water-retaining cup 17 and is greater than the first internal diameter 26 of the conduit unit 12. In this way, the bottom end portion 15 of the conduit unit 12 fits inside the water-retaining cup 17 and flares outward from the intermediate portion 23 of the conduit unit 12. The flotation member 16 of the float assembly 14 has an outer diameter 30 which is less than the second internal diameter 28 of the conduit unit 12 and which is greater than the first internal diameter 26 of the conduit unit 12. In this way, the flotation member 16 is capable of floating freely inside the bottom end portion 15 of the conduit unit 12. In this respect, the bottom end portion 15 of the conduit unit 12 forms a float chamber 53 for the flotation member 16.

More specifically, the bottom end portion 15 of the conduit unit 12 is placed in the water-retaining cup 17 so that the topmost part of the bottom end portion 15 of the conduit unit 12 is placed approximately one inch below the top of the wall of the water-retaining cup 17. The bottom end portion 15 of the conduit unit 12 and the intermediate portion 23 of the conduit unit 12 are oriented with respect to each other at a first obtuse angle 32. The riser unit 18 includes an intermediate riser portion 36 connected to the top riser portion 22, and a bottom riser portion 34 is connected to the intermediate riser portion 36. The bottom riser portion 34 is connected to the intermediate riser portion 36 at a second obtuse angle 33. The first obtuse angle 32 and the second obtuse angle 33 are preferably equal to each other. The obtuse angle causes the conduit unit 12 to be angled away from the mid-portion of the tree 11 so that one can add water to the conduit unit 12 without needing to push aside branches of the tree 11 or ornaments hanging from the tree 11.

A guide assembly 40 is connected to a topmost portion of the top end portion 13 of the conduit unit 12. The guide assembly 40 receives and guides motion of the gauge assembly 20 when water levels in the water-retaining cup 17 rise and fall. The guide assembly 40 includes a gauge-receiving aperture 44 which receives the gauge assembly 20, and a water-inlet aperture 46. The water-inlet aperture 46 receives water (not shown) that is poured into the conduit unit 12. A stop member 48 is connected to a topmost end 49 of the gauge assembly 20. The stop member 48 prevents the topmost end 49 of the gauge assembly 20 from entering the conduit unit 12.

Although the conduit unit 12 can be of a wide range of sizes, it is contemplated that the conduit unit 12 is made from a molded plastic tube that is approximately 1¼ inch in diameter by 42 inches in length with the bottom curved at an obtuse angle of from 140 to 145 degrees about 9 inches from the bottom. The lower 5 inches includes the chamber for the flotation member 16. The bottom end portion 15 of the conduit unit 12 flares from the intermediate portion 23 of the conduit unit 12 to approximately 1½×2½ inches to accommodate a plastic foam or molded flotation member 16. The riser unit 18 is rigid enough to transmit the lifting force of the flotation member 16 but limber enough to easily move through the obtuse-angled section of the conduit unit 12 above the float chamber. If desired, the riser unit 18 can includes a 3/16 inch diameter wooden dowel in the intermediate riser portion 36 and a short section of plastic tubing at the bottom riser portion 34. The gauge assembly 20 is passed through the gauge-receiving aperture 44 of guide assembly 40. The stop member 48 is then screwed onto the topmost end 49 of the gauge assembly 20. The eyelets 41 of the connector assemblies 19 can be formed as integrally molded parts with the conduit unit 12. The flotation member 16 and the riser unit 18, whether molded integrally or assembled, may be installed through the open bottom of the bottom end portion 15 of the conduit unit 12. The gauge assembly 20 is attached to the top riser portion 22.

In using the conduit and float gauge apparatus 10 of the invention, the bottom end portion 15 of the conduit unit 12 is placed into the water-retaining cup 17, and the conduit unit 12 is oriented vertically. It is noted that the water-retaining cup 17 can be supported by a flat base 51 to provided added stability for the tree 11. The strings 43 are threaded through the eyelets 41, and the string 43 are tied to branches of the tree 11 to maintain the conduit unit 12 in the vertical orientation. Water is added to the conduit unit 12 through the water-inlet aperture 46 of the guide assembly 40. When water fills up the water-retaining cup 17, the flotation member 16 is buoyed upward by the water. The movement of the flotation member 16 is transmitted through the riser unit 18 to the gauge assembly 20. As more and more water is added to the water-retaining cup 17, more and more of the gauge assembly 20 is buoyed out of the conduit unit 12. As the amount of water in the water-retaining cup 17 is depleted, the flotation member 16 is lowered, and the gauge assembly 20 lowers so that less of the gauge assembly 20 remains outside of the conduit unit 12. The relative position of the gauge assembly 20 with respect to the conduit unit 12 is used to determine whether water needs to be added or not. When the level of water in the water-retaining cup 17 falls sufficiently, the stop member 48 rests on the guide assembly 40, thereby preventing the gauge assembly 20 from falling into the conduit unit 12.

More specifically, referring to FIG. 4, the position of the stop member 48 which is shown in solid lines indicates that the water level in the water-retaining cup 17 is low and that more water should be added through the water-inlet aperture 46 to reach the water-retaining cup 17 through the conduit unit 12. Indicia on an indicator portion 24 of the gauge assembly 20 can be calibrated with respect to the water-retaining cup 17 to indicate how much water should be added to the water-retaining cup 17 to bring the water-retaining cup 17 to a desired level of water retention. On the other hand, the position of the stop member 48 which is shown in broken lines indicates that the water level in the water-retaining cup 17 is high and that more water need not be added at that time.

The components of the conduit and float gauge apparatus of the invention can be made from inexpensive plastic and metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved conduit and float gauge apparatus that is low in cost, relatively simple in design and operation, and which may advantageously be used without requiring a separate and distinct water reservoir and without requiring a water-flow control mechanism for controlling water flow from a reservoir to a tree. With the invention, a conduit and float gauge apparatus is provided which aids in watering indoor trees without requiring a person to bend down, get on one's knees, or sit down on the floor in order to water the tree. With the invention, a conduit and float gauge apparatus is provided which has a water inlet that is approximately waist high so that a person can stand up straight when watering a Christmas tree or other indoor tree. With the invention, a conduit and float gauge apparatus is provided which has a conduit which conveys water from the periphery of the tree to the base of the tree. With the invention, a conduit and float gauge apparatus provides a water-conveying conduit which is supported by the tree itself. With the invention, a conduit and float gauge apparatus is provided which allows the person to stand upright and determine whether there is a need to water the Christmas tree or other indoor tree.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A conduit and float gauge apparatus for use with a tree placed in a water-retaining cup, comprising:

a conduit unit which includes a top end portion, a bottom end portion, and an intermediate portion located between said top end portion and said bottom end portion, wherein said bottom end portion is placed in said water-retaining cup, a connector assembly for connecting said conduit unit to the tree, such that said connector assembly stabilizes said conduit unit in a vertical orientation, a float assembly housed within said conduit unit, wherein said float assembly includes a flotation member located within said bottom end portion of said conduit unit, wherein said float assembly includes a riser unit connected to said flotation member, wherein said riser unit extends from said bottom end portion of said conduit unit to said top end portion of said conduit unit, and a gauge assembly connected to a top riser portion of said riser unit, wherein said gauge assembly includes an indicator portion which extends out from said conduit unit, wherein said riser unit includes:

an intermediate riser portion connected to said top riser portion, and a bottom riser portion connected to said intermediate riser portion, and wherein said bottom riser portion is connected to said intermediate riser portion at a second obtuse angle.

2. The apparatus of claim 1 wherein said conduit unit has a linear length sufficient to permit a person to add water to the top end portion of the conduit unit without bending down, getting on one's knees, or sitting down on a floor.

3. The apparatus of claim 2 wherein said conduit unit has a linear length which is at least three feet long.

4. The apparatus of claim 1 wherein said connector assembly includes an eyelet attached to said conduit unit and a string threaded through said eyelet.

5. The apparatus of claim 1 wherein:

the water-retaining cup has an internal diameter, said intermediate portion of said conduit unit has a first internal diameter, said bottom end portion of said conduit unit has a second internal diameter, and said second internal diameter of said conduit unit is less than the internal diameter of the water-retaining cup and is greater than said first internal diameter of said conduit unit.

6. The apparatus of claim 5 wherein said flotation member of said float assembly has an outer diameter which is less than said second internal diameter of said conduit unit and greater than said first internal diameter of said conduit unit.

7. The apparatus of claim 1 wherein said bottom end portion of said conduit unit and said intermediate portion of said conduit unit are oriented with respect to each other at a first obtuse angle.

8. The apparatus of claim 1 wherein a bottom end portion of said conduit unit and said intermediate portion of said conduit unit are oriented with respect to each other at a first obtuse angle, and wherein said first obtuse angle and said second obtuse angle are equal to each other.

9. The apparatus of claim 1, further including:

a guide assembly connected to a topmost portion of said top end portion of said conduit unit, wherein said guide assembly receives and guides motion of said gauge assembly when water levels in the water-retaining cup rise and fall.

10. The apparatus of claim 9 wherein said guide assembly includes:

a gauge-receiving aperture which receives said gauge assembly, and a water-inlet aperture.

11. The apparatus of claim 10, further including:

a stop member connected to a topmost end of said gauge assembly, wherein said stop member prevents said topmost end of said gauge assembly from passing through said guide assembly and entering said conduit unit.

\* \* \* \* \*